July 20, 1926.

M. J. FRAMBACH

CHAIN LINK

Filed May 27, 1925

Inventor:
M. J. Frambach,
By Monroe E. Miller
Attorney.

Patented July 20, 1926.

1,593,167

UNITED STATES PATENT OFFICE.

MATHEW J. FRAMBACH, OF HARTLEY, IOWA, ASSIGNOR OF ONE-HALF TO HAROLD C. METCALF, OF HARTLEY, IOWA.

CHAIN LINK.

Application filed May 27, 1925. Serial No. 33,139.

The present invention relates to chains, and aims to provide a chain link of novel form which is especially useful on non-skid chains for automobile wheels, and for similar purposes, the construction of the link being such that it will be capable of withstanding wear and tear, and will facilitate traction.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
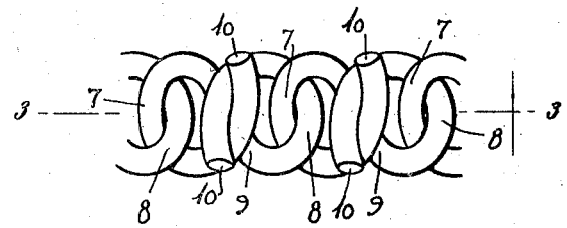
Figure 1 is a plan view of a fragmentary portion of a chain composed of the improved links.
Figure 2:
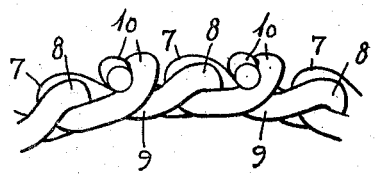
Fig. 2 is a side elevation thereof.
Figure 3:
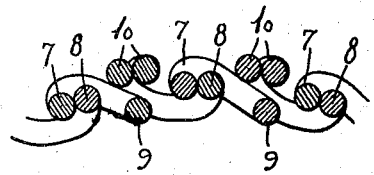
Fig. 3 is a longitudinal section on the line 3—3 of Fig. 1.

Each link is bent or formed from a suitable length of stout or heavy wire, or other suitable stock, and is of figure 8 form, having the loops 7 and 8 at the opposite ends which are inclined transversely of the link in opposite directions, in order that the loops or eyes 7 and 8 of the companion links may be interengaged. The loops 7 and 8 of each link are connected by a diagonal or oblique portion 9, and the terminals 10 of the wire or rod from which the link is formed extend in opposite directions toward opposite sides of the link from the loops 7 and 8 across the portion 9 and cross one another. The terminals 10 are bent to form hooks inter-engaging with one another above or at the outer side of the portion 9. The terminals or hooks 10 are at the outer or exposed side of the link in order to increase the wear of the link and lengthen the life thereof. The terminals or hooks 10 also provide means to grip the ground or road and facilitate traction. Furthermore, the terminals 10 being hooked together will considerably increase the strength of the link, by resisting the pulling apart of the loops 7 and 8, even though the link is not welded. However, the contacting portions of each link may be welded or otherwise secured together, if desired. The portion 9 of the link and those portions between the loops 7 and 8 and the terminals 10 are located at the inner side of the link to bear snugly against the tire or other object across which the chain extends, so that the links will not chafe or injure the tire or object.

Figure 4:
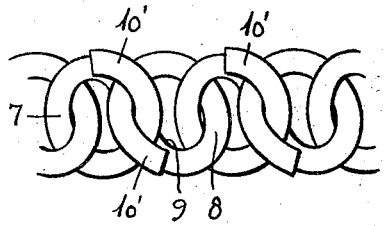
Fig. 4 is a plan view corresponding with Fig. 1 illustrating a modification.

Fig. 4 shows the terminals 10' bent into hooks of greater magnitude than as shown in Fig. 1, with the terminals extending reversely and contacting with the respective loops 7 and 8.

Having thus described the invention, what is claimed as new is:—

1. A chain link bent from a wire and having end loops and terminals extending in opposite directions toward opposite sides of the link from said loops, said terminals crossing one another and being bent into hooks interengaging one another to resist separation of said loops.

2. A chain link bent from a wire and having end loops and terminals extending in opposite directions toward opposite sides of the link from said loops and hooked together to resist separation of said loops, said terminals being located at the outer side of the link to facilitate traction.

3. A chain link bent from a wire having end loops and an oblique portion connecting said loops, with the terminals of the wire extending in opposite directions toward opposite sides of the link from said loops across said oblique portion at the outer side of the link, said terminals crossing one another and being bent into hooks interengaging one another.

In testimony whereof I hereunto affix my signature.

MATHEW J. FRAMBACH.